(12) United States Patent
Sonoda et al.

(10) Patent No.: US 10,401,687 B2
(45) Date of Patent: *Sep. 3, 2019

(54) LIQUID CRYSTAL DISPLAY DEVICE AND METHOD OF MANUFACTURING THAT

(71) Applicants: Japan Display Inc., Tokyo (JP); Panasonic Liquid Crystal Display Co., Ltd., Hyogo-ken (JP)

(72) Inventors: Hidehiro Sonoda, Mobara (JP); Chikae Matsui, Mobara (JP); Noboru Kunimatsu, Chiba (JP)

(73) Assignees: Japan Display Inc., Tokyo (JP); Panasonic Liquid Crystal Display Co., Ltd., Hyogo-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/226,836

(22) Filed: Dec. 20, 2018

(65) Prior Publication Data

US 2019/0121203 A1 Apr. 25, 2019

Related U.S. Application Data

(63) Continuation of application No. 15/719,706, filed on Sep. 29, 2017, now Pat. No. 10,197,860, which is a (Continued)

(30) Foreign Application Priority Data

May 22, 2008 (JP) .................................. 2008-133840

(51) Int. Cl.
*G02F 1/1337* (2006.01)
*G02F 1/1339* (2006.01)
(Continued)

(52) U.S. Cl.
CPC ...... *G02F 1/133711* (2013.01); *G02F 1/1337* (2013.01); *G02F 1/1339* (2013.01);
(Continued)

(58) Field of Classification Search
CPC ......... G02F 1/133788; G02F 1/133753; G02F 1/133711; G02F 1/133707; G02F 1/134363
See application file for complete search history.

(56) References Cited

U.S. PATENT DOCUMENTS 6,816,219 B2  11/2004  Akagi et al.
7,453,544 B2  11/2008  Toriyama et al.
(Continued)

FOREIGN PATENT DOCUMENTS

JP          2000-267114 A      9/2000

*Primary Examiner* — Jennifer Doan
(74) *Attorney, Agent, or Firm* — Michael Best & Friedrich LLP

(57) ABSTRACT

A liquid crystal display device includes a first substrate, a first alignment film formed over the first substrate, a second substrate, a second alignment film formed over the second substrate, a liquid crystal layer sandwiched between the first alignment film and the second alignment film, and a projecting portion formed over the second substrate. The first alignment film is a photo alignment film, and a thickness "d2" of the second alignment film over the projecting portion and a film thickness "d1" of a portion of the first alignment film facing the projecting portion satisfy formula (2), $$d2 < d1 \qquad (2).$$

18 Claims, 13 Drawing Sheets

Related U.S. Application Data continuation of application No. 15/360,595, filed on Nov. 23, 2016, now Pat. No. 9,804,445, which is a continuation of application No. 15/180,163, filed on Jun. 13, 2016, now Pat. No. 9,581,864, which is a continuation of application No. 14/738,369, filed on Jun. 12, 2015, now Pat. No. 9,389,465, which is a continuation of application No. 14/287,795, filed on May 27, 2014, now Pat. No. 9,086,597, which is a continuation of application No. 13/872,451, filed on Apr. 29, 2013, now Pat. No. 8,749,741, which is a continuation of application No. 13/571,969, filed on Aug. 10, 2012, now Pat. No. 8,432,517, which is a continuation of application No. 13/230,252, filed on Sep. 12, 2011, now Pat. No. 8,243,240, which is a continuation of application No. 12/962,128, filed on Dec. 7, 2010, now Pat. No. 8,040,478, which is a continuation of application No. 12/470,500, filed on May 22, 2009, now Pat. No. 7,859,625.

(51) Int. Cl.
*G02F 1/1333* (2006.01)
*G02F 1/1343* (2006.01)
*G02F 1/1368* (2006.01)
*G02F 1/1335* (2006.01)
*G02F 1/1362* (2006.01)

(52) U.S. Cl.
CPC ........ *G02F 1/1368* (2013.01); *G02F 1/13394* (2013.01); *G02F 1/13439* (2013.01); *G02F 1/133345* (2013.01); *G02F 1/133514* (2013.01); *G02F 1/133719* (2013.01); *G02F 1/133723* (2013.01); *G02F 1/133788* (2013.01); *G02F 1/134309* (2013.01); *G02F 1/136286* (2013.01); *G02F 2001/133519* (2013.01); *G02F 2201/121* (2013.01); *G02F 2201/123* (2013.01)

(56) References Cited

U.S. PATENT DOCUMENTS

| | | | |
|---|---|---|---|
| 7,551,250 | B2 | 6/2009 | Okumura |
| 7,646,466 | B2 | 1/2010 | Hashimoto |
| 7,859,625 | B2 | 12/2010 | Sonoda et al. |
| 8,040,478 | B2 | 10/2011 | Sonoda et al. |
| 8,243,240 | B2 | 8/2012 | Sonoda et al. |
| 8,351,003 | B2 | 1/2013 | Sonoda et al. |
| 8,432,517 | B2 | 4/2013 | Sonoda et al. |
| 8,749,741 | B2 | 6/2014 | Sonoda et al. |
| 9,086,597 | B2 | 7/2015 | Sonoda et al. |
| 9,389,465 | B2 | 7/2016 | Sonoda et al. |
| 9,581,864 | B2 | 2/2017 | Sonoda et al. |
| 9,804,445 | B2 | 10/2017 | Sonoda et al. |
| 10,197,860 | B2 * | 2/2019 | Sonoda ............ G02F 1/133723 |
| 2006/0192738 | A1 | 8/2006 | Kawamura et al. |
| 2011/0234959 | A1 | 9/2011 | Ochiai et al. |
| 2016/0291416 | A1 | 10/2016 | Sonoda et al. |

* cited by examiner

FIG. 2

LAYER STRUCTURE OF COUNTER SUBSTRATE

| No. | | ITEM | MATERIAL | FORMED FILM THICKNESS |
|---|---|---|---|---|
| 1 | SUBSTRATE SIDE | BM | ACRYL | 1400 |
| 2 | | COLOR PIXEL LAYER | ACRYL | 1400 |
| 3 | | OVERCOAT | ACRYL.-EPOXY | 2000 |
| 4 | | PILLAR-SHAPED SPACER | ACRYL.-EPOXY | 4000 |
| 5 | LIQUID-CRYSTAL -LAYER SIDE | ALIGNMENT FILM (FILM THICKNESS: "C") | POLYIMIDE | DESCRIBED IN SEPARATE DRAWING |

LAYER STRUCTURE OF ELECTRODE SUBSTRATE

| No. | | ITEM | MATERIAL | FORMED FILM THICKNESS |
|---|---|---|---|---|
| 8 | LIQUID-CRYSTAL -LAYER SIDE | ALIGNMENT FILM (FILM THICKNESS: "A") | POLYIMIDE | DESCRIBED IN SEPARATE DRAWING |
| 7 | | PIXEL ELECTRODE | ITO | 50 |
| 6 | | PROTECTIVE FILM | SiNx | 500 |
| 5 | | SOURCE/DRAIN | Al | 300 |
| 4 | | a-Si | a-Si | 200 |
| 3 | | GATE INSULATION FILM | SiNx | 600 |
| 2 | | GATE | Al | 300 |
| 1 | SUBSTRATE SIDE | COMMON ITO | ITO | 80 |

FIG. 3

| | SOLUTION CONCENTRATION | SOLUTION VISCOSITY | BEFORE RADIATION OF LIGHT | | | AFTER RADIATION OF LIGHT | | |
|---|---|---|---|---|---|---|---|---|
| | | | FILM THICKNESS "A" | FILM THICKNESS "B" | FILM THICKNESS "C" | FILM THICKNESS "A" | FILM THICKNESS "B" | FILM THICKNESS "C" |
| EXAMPLE 1 | 7 wt% | 30 mPa·s | 135 nm | 21 nm | 140 nm | 110 nm | 13 nm | 110 nm |
| EXAMPLE 2 | 7 wt% | 25 mPa·s | 125 nm | 17 nm | 125 nm | 100 nm | 10 nm | 100 nm |
| EXAMPLE 3 | 8 wt% | 20 mPa·s | 140 nm | 15 nm | 140 nm | 110 nm | 8 nm | 110 nm |
| EXAMPLE 4 | 7 wt% | 35 mPa·s | 155 nm | 40 nm | 155 nm | 120 nm | 30 nm | 120 nm |
| COMPARISON EXAMPLE 1 | 6 wt% | 50 mPa·s | 140 nm | 100 nm | 140 nm | 110 nm | 80 nm | 110 nm |
| COMPARISON EXAMPLE 2 | 5 wt% | 45 mPa·s | 110 nm | 80 nm | 110 nm | 80 nm | 55 nm | 80 nm |
| COMPARISON EXAMPLE 3 | 6 wt% | 40 mPa·s | 125 nm | 50 nm | 125 nm | 100 nm | 35 nm | 100 nm |

FIG. 5

LAYER STRUCTURE OF COUNTER SUBSTRATE

| No. | | ITEM | MATERIAL | FORMED FILM THICKNESS |
|---|---|---|---|---|
| 1 | SUBSTRATE SIDE | BM | ACRYL | 1400 |
| 2 | | COLOR PIXEL LAYER | ACRYL | 1400 |
| 3 | | OVERCOAT | ACRYL-EPOXY | 2000 |
| 4 | | PEDESTAL | ACRYL-EPOXY | 500 |
| 5 | LIQUID-CRYSTAL -LAYER SIDE | ALIGNMENT FILM (FILM THICKNESS: "C") | POLYIMIDE | DESCRIBED IN SEPARATE DRAWING |

LAYER STRUCTURE OF ELECTRODE SUBSTRATE

| No. | | ITEM | MATERIAL | FORMED FILM THICKNESS |
|---|---|---|---|---|
| 9 | LIQUID-CRYSTAL -LAYER SIDE | ALIGNMENT FILM (FILM THICKNESS: "A") | POLYIMIDE | DESCRIBED IN SEPARATE DRAWING |
| 8 | | PILLAR-SHAPED SPACER | ACRYL-EPOXY | 4000 |
| 7 | | PIXEL ELECTRODE | ITO | 50 |
| 6 | | PROTECTIVE FILM | SiNx | 500 |
| 5 | | SOURCE/DRAIN | Al | 300 |
| 4 | | a-Si | a-Si | 200 |
| 3 | | GATE INSULATION FILM | SiNx | 600 |
| 2 | | GATE | Al | 300 |
| 1 | SUBSTRATE SIDE | COMMON ITO | ITO | 80 |

FIG. 6

| | SOLUTION CONCENT-RATION | SOLUTION VISCOSITY | BEFORE RADIATION OF LIGHT | | | AFTER RADIATION OF LIGHT | | |
|---|---|---|---|---|---|---|---|---|
| | | | FILM THICKNESS "A" | FILM THICKNESS "B" | FILM THICKNESS "C" | FILM THICKNESS "A" | FILM THICKNESS "B" | FILM THICKNESS "C" |
| EXAMPLE 5 | 7 wt% | 30 mPa·s | 135 nm | 22 nm | 140 nm | 110 nm | 13 nm | 110 nm |
| EXAMPLE 6 | 7 wt% | 25 mPa·s | 125 nm | 17 nm | 125 nm | 100 nm | 10 nm | 100 nm |
| EXAMPLE 7 | 8 wt% | 25 mPa·s | 140 nm | 16 nm | 140 nm | 110 nm | 8 nm | 110 nm |
| EXAMPLE 8 | 7 wt% | 35 mPa·s | 155 nm | 40 nm | 155 nm | 120 nm | 30 nm | 120 nm |
| COMPARISON EXAMPLE 4 | 6 wt% | 50 mPa·s | 140 nm | 100 nm | 140 nm | 110 nm | 80 nm | 110 nm |
| COMPARISON EXAMPLE 5 | 5 wt% | 45 mPa·s | 110 nm | 80 nm | 110 nm | 80 nm | 55 nm | 80 nm |
| COMPARISON EXAMPLE 6 | 6 wt% | 40 mPa·s | 125 nm | 50 nm | 125 nm | 100 nm | 35 nm | 100 nm |

FIG. 8

| | SOLUTION CONCENT-RATION | SOLUTION VISCOSITY | BEFORE RADIATION OF LIGHT | | | AFTER RADIATION OF LIGHT | | |
|---|---|---|---|---|---|---|---|---|
| | | | FILM THICKNESS "A" | FILM THICKNESS "B" | FILM THICKNESS "C" | FILM THICKNESS "A" | FILM THICKNESS "B" | FILM THICKNESS "C" |
| EXAMPLE 9 | 7 wt% | 30 mPa·s | 135 nm | 30 nm | 140 nm | 110 nm | 21 nm | 110 nm |
| EXAMPLE 10 | 7 wt% | 25 mPa·s | 125 nm | 25 nm | 125 nm | 100 nm | 18 nm | 100 nm |
| EXAMPLE 11 | 8 wt% | 25 mPa·s | 140 nm | 20 nm | 140 nm | 110 nm | 14 nm | 110 nm |
| COMPARISON EXAMPLE 7 | 6 wt% | 50 mPa·s | 140 nm | 110 nm | 140 nm | 110 nm | 90 nm | 110 nm |
| COMPARISON EXAMPLE 8 | 5 wt% | 45 mPa·s | 110 nm | 90 nm | 110 nm | 80 nm | 60 nm | 80 nm |
| COMPARISON EXAMPLE 9 | 6 wt% | 40 mPa·s | 125 nm | 55 nm | 125 nm | 100 nm | 40 nm | 100 nm |

FIG. 10

| | SOLUTION CONCENT-RATION | SOLUTION VISCOSITY | BEFORE RADIATION OF LIGHT ||| AFTER RADIATION OF LIGHT |||
|---|---|---|---|---|---|---|---|---|
| | | | FILM THICKNESS "A" | FILM THICKNESS "B" | FILM THICKNESS "C" | FILM THICKNESS "A" | FILM THICKNESS "B" | FILM THICKNESS "C" |
| COMPARISON EXAMPLE 10 | 7 wt% | 30 mPa·s | 135 nm | 120 nm | 135 nm | 110 nm | 100 nm | 110 nm |

FIG. 11

| | FILM THICKNESS "B" AFTER RADIATION OF LIGHT | BRIGHT-SPOT-GENERATION WITHSTAND VOLTAGE LEVEL |
|---|---|---|
| EXAMPLE 1 | 13 nm | 0 |
| EXAMPLE 2 | 10 nm | 0 |
| EXAMPLE 3 | 8 nm | 0 |
| EXAMPLE 4 | 30 nm | 1 |
| COMPARISON EXAMPLE 1 | 80 nm | 6 |
| COMPARISON EXAMPLE 2 | 55 nm | 5 |
| COMPARISON EXAMPLE 3 | 35 nm | 3 |
| EXAMPLE 5 | 13 nm | 0 |
| EXAMPLE 6 | 10 nm | 0 |
| EXAMPLE 7 | 8 nm | 0 |
| EXAMPLE 8 | 30 nm | 2 |
| COMPARISON EXAMPLE 4 | 80 nm | 6 |
| COMPARISON EXAMPLE 5 | 55 nm | 6 |
| COMPARISON EXAMPLE 6 | 35 nm | 3 |
| EXAMPLE 9 | 21 nm | 1 |
| EXAMPLE 10 | 18 nm | 0 |
| EXAMPLE 11 | 14 nm | 0 |
| COMPARISON EXAMPLE 7 | 90 nm | 6 |
| COMPARISON EXAMPLE 8 | 60 nm | 6 |
| COMPARISON EXAMPLE 9 | 40 nm | 4 |
| COMPARISON EXAMPLE 10 | 100 nm | 6 |

FIG. 12

| DEFINI-TION | BRIGHT-SPOT-GENERA-TION WITH-STAND VOLTAGE LEVEL | GENERATION OF BRIGHT SPOTS AT THE TIME OF COMPLETION OF LIQUID CRYSTAL DISPLAY DEVICE | ABRASION OF SURFACE ALIGNMENT FILM AT THE TIME OF DISASSEMBLING LIQUID CRYSTAL DISPLAY DEVICE | GENERATION OF BRIGHT SPOTS AFTER VIBRATION TEST (3G) | ABRASION OF SURFACE ALIGNMENT FILM AFTER VIBRATION TEST (3G) | GENERATION OF BRIGHT SPOTS AFTER VIBRATION TEST (5G) | ABRASION OF SURFACE ALIGNMENT FILM AFTER VIBRATION TEST (5G) |
|---|---|---|---|---|---|---|---|
| GOOD | 0 | NOT PRESENT | NOT PRESENT | NOT PRESENT | NOT PRESENT | NOT PRESENT | NOT PRESENT |
| ↑ | 1 | NOT PRESENT | NOT PRESENT | NOT PRESENT | NOT PRESENT | NOT PRESENT | SLIGHTLY PRESENT |
|  | 2 | NOT PRESENT | NOT PRESENT | NOT PRESENT | NOT PRESENT | PRESENT | PRESENT |
|  | 3 | NOT PRESENT | NOT PRESENT | PRESENT | PRESENT | PRESENT | PRESENT |
|  | 4 | NOT PRESENT | NOT PRESENT | PRESENT | PRESENT | PRESENT | PRESENT |
| ↓ | 5 | NOT PRESENT | PRESENT | PRESENT | PRESENT | PRESENT | PRESENT |
| BAD | 6 | PRESENT | PRESENT | PRESENT | PRESENT | PRESENT | PRESENT |

RELATIONSHIP BETWEEN PEDESTAL
ALIGNMENT FILM THICKNESS
AND BRIGHT-SPOT-GENERATION

LIQUID CRYSTAL DISPLAY DEVICE AND METHOD OF MANUFACTURING THAT

CROSS REFERENCE TO RELATED APPLICATIONS

This application is a continuation of U.S. application Ser. No. 15/719,706, filed on Sep. 29, 2017, which is a continuation of Ser. No. 15/360,595, filed Nov. 23, 2016, now U.S. Pat. No. 9,804,445, which is a continuation of U.S. application Ser. No. 15/180,163, filed Jun. 13, 2016, now U.S. Pat. No. 9,581,864, which is a continuation of U.S. application Ser. No. 14/738,369, filed Jun. 12, 2015, now U.S. Pat. No. 9,389,465, which is a continuation of U.S. application Ser. No. 14/287,795, filed May 27, 2014, now U.S. Pat. No. 9,086,597, which is a continuation of U.S. application Ser. No. 13/872,451, filed Apr. 29, 2013, now U.S. Pat. No. 8,749,741, which is a continuation of U.S. application Ser. No. 13/571,969, filed Aug. 10, 2012, now U.S. Pat. No. 8,432,517, which is a continuation of U.S. application Ser. No. 13/230,252, filed Sep. 12, 2011, now U.S. Pat. No. 8,243,240, which is a continuation of U.S. application Ser. No. 12/962,128, filed Dec. 7, 2010, now U.S. Pat. No. 8,040,478, which is a continuation of U.S. application Ser. No. 12/470,500, filed May 22, 2009, now U.S. Pat. No. 7,859,625, the entire contents of which are incorporated herein by reference. This application also relates to U.S. application Ser. No. 13/571,930, filed Aug. 10, 2012, now U.S. Pat. No. 8,351,003, which is a continuation of U.S. application Ser. No. 13/230,252, filed Sep. 12, 2011, now U.S. Pat. No. 8,243,240, the entire contents of which are incorporated herein by reference. Further, this application claims priority from Japanese Application Serial No. 2008-133840, filed on May 22, 2008, the entire contents of which are hereby incorporated by reference into this application.

BACKGROUND OF THE INVENTION

1. Field of the Invention

The present invention relates to a liquid crystal display device and a manufacturing method thereof, and more particularly to a liquid crystal display device to which an improvement of an alignment film is applied and a manufacturing method thereof.

2. Description of the Related Art

A liquid crystal display device is a display device which adjusts a quantity of transmitting light from a light source by controlling the direction of liquid crystal molecules with an electric field.

In a TN (Twisted Nematic) mode, an IPS (In-Plane Switching) mode, and a VA (Vertical Alignment) mode which are applied to many active matrix display devices currently, it is necessary to create a stable alignment state and hence, it is necessary to form an alignment film on at least one of opposedly-facing surfaces of a pair of substrates which sandwich a liquid crystal layer therebetween.

Particularly, in the TN mode and the IPS mode, in principle, it is necessary to perform treatment which imparts an ability of controlling the alignment in the fixed direction to at least one of opposedly-facing surfaces of the pair of substrates. Further, in the VA mode, it may be possible to control initial driving of the liquid crystal molecules by forming projections or stripes on at least one of opposedly-facing surfaces of the pair of substrates. However, in forming these projections or stripes, there exists a possibility that the throughput lowered at the time of forming the projections or the stripes. On the other hand, when neither projections nor stripes are formed, it is necessary to impart an ability of controlling the alignment in the particular direction with respect to an alignment film.

There may be a case where surface unevenness is provided to a background of the alignment film. For example, the liquid crystal display device adopts the constitution in which spacers (hereinafter referred to as pillar-shaped spacers) are arranged on one of opposedly-facing surfaces of the pair of substrates in place of scattering bead spacers as separate members, and spacer pedestals which are arranged to face the pillar-shaped spacers in an opposed manner are formed on another opposedly-facing surface.

To consider a case where an impact is applied to the liquid crystal display device having such a constitution, when the spacer and the spacer pedestal are brought to with each other, an alignment film on a surface of the spacer is abraded or peeled off thus giving rise to drawback that bright spots are generated thus causing a display defect.

A technique which can overcome his drawback is disclosed in JP-A-2000-267114 (patent document 1).

Patent document 1 states that the above-mentioned drawback can be overcome by making a film thickness of an alignment film on a top surface of a spacer smaller than a film thickness of the alignment film on portions other than the top surface of the spacer (or setting the film thickness of the alignment film on the top surface of the spacer to zero). In other words, the drawback can be overcome by applying an alignment film material and, thereafter, by performing time-prolonged leveling corresponding to viscosity by prolonging a time for leveling. To be more specific, patent document 1 states "a solution containing polyimide is applied by coating to the whole surface of a glass substrate on which pixel electrodes are formed by offset printing, a coated film is leveled for 60 seconds, and the leveled coated film is dried at a temperature of 100° C., and is baked at a temperature of 180° C. for 1 hour thus forming an alignment film having a thickness of 1000 angstrom. Thereafter, rubbing treatment is applied to the alignment film." That is, due to (A): "leveling processing", an organic solvent containing the alignment film material arranged on an upper surface of a projection is moved to a low place around the projection and hence, the organic solvent is leveled. By prolonging this time, "local reduction of film thickness" of the alignment film on the projection can be realized. Further, due to (B): "baking process", the organic solvent is evaporated so that "the reduction film thickness at a fixed ratio over the whole surface" of the alignment film can be realized. With respect to the alignment film to which rubbing treatment is applied, the film thickness of the whole alignment film is substantially determined through these two reduction-of-film-thickness processes.

SUMMARY OF THE INVENTION

In the method disclosed in patent document 1, the projection which constitutes the spacer is sufficiently high, that is, a height of the spacer is 2 to 3 μm and hence, the alignment film is formed such that the leveling of the film can be realized by performing leveling for approximately 60 seconds, thus forming the alignment film such that only the alignment film having a thickness of approximately several nm remains on the upper surface of the spacer. However, when a pedestal which is smaller and lower than the spacer is adopted as the spacer pedestal, a display defect occurs even when the structure disclosed in patent document 1 is adopted.

Accordingly, it is an object the present invention to provide a liquid crystal display device which can eliminate such a display defect.

Inventors of the present invention, upon analysis of a mode of the above-mentioned display defect, arrived at an idea that the display defect is caused not only by the alignment film on the pillar-shaped spacer but also by the alignment film on the spacer pedestal.

Accordingly, the inventors of the present invention made an attempt to make the alignment film thin by applying leveling (flattening) treatment to the alignment film as in the case of the related art. However, the spacer pedestal arranged on an opposedly facing surface of the pillar-shaped spacer usually has a thickness of only approximately 0.5 μm and hence, the film thickness of the alignment film on the spacer pedestal cannot be sufficiently decreased. To be more specific, although the reduction of the film thickness of the alignment film also depends on viscosity, the film thickness of the alignment film on the spacer pedestal is reduced to only approximately 60 to 80% of the film thickness of the alignment film of the pixel electrode.

Such a film thickness reducing operation still leaves the alignment film having the large thickness on the spacer pedestal thus giving rise to a display defect which is caused by peeling of the alignment film attributed to a contact between the pillar-shaped spacer and the spacer pedestal.

Inventors of the present invention then studied a method of increasing a height of a spacer pedestal. The inventors of the present invention made an attempt to form the spacer pedestals by using only line layers and silicon layers of transistors formed on an active matrix substrate on which the spacer pedestals are formed for forming the spacer pedestals at a low cost. It is found difficult to form the spacer pedestals having a height exceeding 1.0 μm without increasing the number of processes. Basically, the spacer pedestal having such a height is weak against an impact and hence, the spacer pedestal is not preferable as a spacer pedestal.

The inventors of the present invention, then, considered the formation of the alignment film having the small thickness as a whole by decreasing a quantity of an organic solvent containing an alignment film material. However, such a method spends a considerable time in leveling, gives rise to surface irregularities on the alignment film formed on the pixel electrode and hence, there may be a case that the alignment film on the pixel electrode cannot ensure a sufficient film thickness.

In this manner, the conventional approaches have suffered from the restriction in the manufacture of liquid crystal display devices.

As disclosed in JP-A-2005-351924 (patent document 2), inventors of the present invention studied the use of a photo alignment film as an alignment film of an IPS type liquid crystal display device and arrived at the following idea through studies on a photo-decomposition-type alignment film material. That is, the inventors of the present invention particularly considered that by forming an alignment film by printing and baking a volatile organic solvent containing a photo-decomposition-type alignment film material, and by radiating a polarized ultra-violet rays to the alignment film under a high temperature environment of approximately 200° C., the alignment film is evaporated in a moment that the alignment film is subject to photo decomposition so that a film thickness of the alignment film is decreased.

Accordingly, inventors of the present invention manufactured a liquid crystal display device in which a photo-decomposition-type photo alignment film is used as an alignment film of a liquid crystal display device which forms pillar-shaped spacers on one of the pair of substrates and spacer pedestals on another of the pair of substrates, and a linearly polarized light is radiated to the alignment film thus imparting an alignment control function n to the liquid crystal display device.

To be more specific, an organic solvent which uses an alignment film material having a skeleton formed of cyclobutane tetracarboxylic acid-diamine phenyl ether is printed on a layer above the spacer pedestals as an alignment film material, the organic solvent is left for leveling (A: "leveling process"), and, thereafter, the organic solvent is dried and temporarily baked (B: "baking process"). A film thickness of the alignment film is measured after such temporary baking. Then, a polarized light is radiated to the alignment film for imparting an alignment control ability to the alignment film and, at the same time, a decomposed material is sublimed under a high-temperature environment of approximately 200° C. (C: "alignment imparting process"), and the film thickness of the alignment film is again measured. As a result, it is found that the thickness of the alignment film is reduced after baking.

That is, the inventors of the present invention have found the following. In performing a control of the film thickness of the photo-decomposition-type photo alignment film, and more particularly, a control of locally decreasing the film thickness of the photo alignment film on the spacer pedestal using the spacer pedestal which is smaller and lower than the pillar-shaped spacer, it is necessary to control not only the condition on (A) "leveling process" in which "the film thickness is locally reduced" and the condition on (B) "baking process" in which the film thickness is reduced at a rate "a" per hour as in the case of the alignment film to be rubbed but also a condition on (C) "alignment imparting process" in which the film thickness is reduced at a fixed quantity "b" per hour.

To be more specific, in the above-mentioned (A) "leveling process", the inventors of the present invention formed, as the alignment film on the spacer pedestal, an alignment film using an organic solvent having the same viscosity as the alignment film on the pillar-shaped spacer on a color filter substrate side as described in the related art. However, the inventors of the present invention could not achieve the sufficient reduction of the film thickness. This is attributed to a fact that the spacer pedestal is lower than the pillar-shaped spacer and hence, there may be a case in that, in the adjustment of viscosity of the organic solvent for the alignment film on the pillar-shaped spacer, the viscosity is so high that the sufficient leveling cannot be performed. Accordingly, inventors of the present invention newly sought for a viscosity range of a volatile organic solvent containing an alignment film material to be printed. As a result, the inventors of the present invention have found that a volatile organic solvent having viscosity of 35 Pa·s or less which contains a photo-decomposition-type alignment film material is necessary.

In the related art, in (A) "leveling" and (B) "baking process", when the viscosity of the organic solvent is adjusted for forming the pillar-shaped spacer, the relationship of film thickness of alignment film on the spacer pedestal/the film thickness of the alignment film on the pixel electrode is set to approximately 60 nm/120 nm, while when the viscosity of the organic solvent is adjusted for forming the spacer pedestal, the film thickness can be reduced to an extent that the relationship becomes approximately 30 nm/120 nm.

Further, in (C) "alignment imparting process" found by the inventors of the present invention, the film thickness of the whole alignment film can be reduced by a fixed quantity and hence, the reduction of the film thickness can be realized to an extent that the relationship of the film thickness of the alignment film do the spacer pedestal/the film thickness of alignment film on the pixel electrode becomes approximately 10 to 15 nm/100 nm.

In this manner, the present invention realizes a novel task of "the display defect attributed to "peeling of alignment film" generated on "the alignment film on the spacer pedestal"" which differs from "the alignment film on the pillar-shaped spacer" by a novel means which controls the condition on (C) "alignment imparting processing" for newly "reducing the film thickness at fixed quantity b/hour" besides (A) "leveling process" for "locally reducing the film thickness" and (B) "baking process".

As a result, it is possible to, for the first time, realize a liquid crystal display device in which a film thickness "d1" of a photo-decomposition-type photo alignment film formed on the spacer pedestal (structure having an upper surface area smaller than the pillar-shaped spacer and being lower than the pillar-shaped spacer) satisfies a following formula 1.

$$0\ nm < d1 \leq 30\ nm \qquad \text{Formula 1}$$

The thin alignment film formed on the spacer pedestal formed in this manner is hardly peeled off or abraded. This result is brought about try coupling agent which is added to the alignment film for enhancing adhesiveness of the alignment film with a background substrate. That is, it is considered that the alignment film is chemically coupled to a background layer on an interface between the alignment film and the background layer due to the coupling agent so that the alignment film close to the background layer exhibits high adhesiveness, while influence of the coupling agent is decreased along with the increase of a distance from the background layer thus lowering the adhesiveness. Accordingly, it is considered that the thinner the formed alignment film becomes, the larger the adhesiveness of the alignment film is influenced by the coupling agent so that the adhesiveness is enhanced whereby the abrasion resistance of the alignment film at a portion thereof which is in contact with the pillar-shaped spacer is increased.

It must be noted that when the film thickness of the alignment film is extremely reduced over the whole surface of the spacer pedestal, a so-called pin hole phenomenon in which the alignment is not formed partially is generated so that non-alignment portions are formed thus giving rise to a display defect such as bright spots. Accordingly, it is preferable to set a film thickness of the alignment film on a BM opening portion where the spacer pedestal is not arranged larger than the film thickness of the alignment film at portions where the alignment film is in contact with the pillar-shaped spacer.

It is preferable to form a dedicated pattern for the spacer pedestal without arranging the spacer pedestal on the TFT element. The formation of the dedicated pattern reduces the possibility of generating physical damages or the deterioration of characteristics of existing parts. Further, the dedicated pattern can be formed without additionally performing a photolithography step when the dedicated pattern is arranged using the layered structure formed of the semiconductor layer, the gate electrode layer, the source electrode layer and the like which constitutes the element and hence, productivity is high.

The present invention is constituted as follows, for example.

(1) According to one aspect of the present invention, there is provided a manufacturing method of a liquid crystal display device which, for example, includes: a pair of substrates; a liquid crystal layer which is sandwiched between the pair of substrates; a first alignment film which is formed on one of opposedly-facing surfaces of the pair of substrates; a second alignment film which is formed on another of opposedly-facing surfaces of the pair of substrates; first projecting portions which are provided to the first alignment film and project into the liquid crystal layer from first constitutional members which constitute a layer below the first alignment film; and second projecting portions which are provided to the second alignment film, face the first projecting portions, and project into the liquid crystal layer by second constitutional members which constitute a layer below the second alignment film, the first projecting portion being set lower than the second projecting portion, and an area of an upper surface of the first projecting portion is set smaller than an area of an upper surface of the second projecting portion, wherein the manufacturing method of a liquid crystal display device includes a first step of forming a photo-decomposition-type polyimide film as the first alignment film by baking a volatile organic solvent containing a photo-decomposition-type polyimide acid having viscosity of not more than 35 mPa·s; and a second step of baking the polyimide film by radiating polarized light containing ultraviolet rays to the polyimide film.

(2) In the above-mentioned manufacturing method of a liquid crystal display device having the constitution (1), for example, the manufacturing method may further include a third step of forming a photo-decomposition-type polyimide film as the second alignment film by baking a volatile organic solvent containing a photo-decomposition-type polyimide acid having viscosity of not more than 35 mPa·s; and a fourth step of baking the polyimide film by radiating polarized light containing ultraviolet rays to the polyimide film.

(3) in the above-mentioned manufacturing method of a liquid crystal display device having the constitution (1), for example, one of the pair of substrates may include thin film transistors between the substrate and the first alignment film, and the first constitutional member may include at least one of a semiconductor layer, a gate oxide film, a gate electrode, an interlayer insulation film, a source electrode, and a drain electrode which constitute the thin film transistor.

(4) in the above-mentioned manufacturing method of a liquid crystal display device having the constitution (3), for example, the liquid crystal display device may include pixel electrodes each of which is connected to one of the source electrode and the drain electrode of said thin film transistor, and another substrate includes the counter electrode.

(5) In the above-mentioned manufacturing method of liquid crystal display device having the constitution (1), for example, the first projecting portion may have a frusto-conical shape.

(6) According to another aspect of the present invention, there is provided a liquid crystal display device which, for example, includes: a pair of substrates; a liquid crystal layer which is sandwiched between the pair of substrates; a first alignment film which is formed on one of opposedly facing surfaces of the pair of substrates; a second alignment film which is formed on another of opposedly-facing surfaces of the pair of substrates; first projecting portions which are provided to the first alignment film and project into the liquid crystal layer by first constitutional members which constitute a layer below the first alignment film; and second projecting portions which are provided to the second alignment film, face the first projecting portions, and project into the liquid crystal layer by second constitutional members which constitute a layer below the second alignment film, the first projecting portion being set lower than the second projecting portion, and an area of an upper surface of the first projecting portion being set smaller than an area of an upper surface of the second projecting portion, wherein the first alignment film is made of a photo-decomposition-type alignment film material, and a film thickness "d1" of the first alignment film on the first projecting portion and a film thickness "d2" of the second alignment film on the second projecting portion satisfy a formula (1) and a formula (2).

$$0 \text{ nm} < d1 < 30 \text{ nm} \quad (1)$$

$$d2 < d1 \quad (2)$$

(7) In the above-mentioned liquid crystal display device having the constitution (6), for example, the second alignment film may be made of a photo-decomposition-type alignment film material.

(8) In the above-mentioned liquid crystal display device having the composition (6), for example one of the pair of substrates may include thin film transistors between the substrate and the first alignment film, and the first constitutional member may include at least, one of a semiconductor layer, a gate oxide film, a gate electrode, an interlayer insulation film, a source electrode, and a drain electrode which constitute the thin film transistor.

(9) In the above-mentioned liquid crystal display device having the constitution (8), for example, the liquid crystal display device may include pixel electrodes each of which is connected to one of the source electrode and the drain electrode of each thin film transistor, and another substrate includes the counter electrode.

(10) in the above-mentioned liquid crystal display device having the constitution (6), for example, the first projecting portion may have a frusto-conical shape.

The above-mentioned constitutions are provided merely as examples and the various modifications can be suitably made without departing from a technical concept of the present invention. Further, constitutional examples of the present invention other than the above-mentioned constitutions will become apparent from the whole description of this specification and drawings.

According to the liquid crystal display device and the manufacturing method thereof having the above-mentioned constitutions the present invention can eliminate or reduce a display defect. Other advantageous effects of the present invention will become apparent from the whole description of this specification.

BRIEF DESCRIPTION OF THE DRAWINGS

FIG. 2 is a table showing constitutional members of the liquid crystal display device shown in FIG. 1 and film thicknesses of these constitutional members;

FIG. 3 is a table showing the manufacture of alignment films in the liquid crystal display device shown in FIG. 1, and film thicknesses of the alignment films obtained by the manufacture;

FIG. 5 is a table showing constitutional members of the liquid crystal display device shown in FIG. 4 and film thicknesses of these constitutional members;

FIG. 6 is a table showing the manufacture of alignment films in the liquid crystal display device shown in FIG. 4, and film thicknesses of the alignment films obtained by the manufacture;

FIG. 8 is table showing the manufacture of alignment films in the liquid crystal display device shown in FIG. 7, and film thicknesses of the alignment file is obtained by the manufacture;

FIG. 10 is a table showing the manufacture of alignment films in the liquid crystal display device shown in FIG. 9, and film thicknesses of the alignment films obtained by the manufacture;

FIG. 11 is a table showing a bright-spot-generation withstand voltage level in the above-mentioned respective embodiments;

FIG. 12 is a table describing a content of references for determining the above-mentioned bright-spot-generation withstand voltage level.

DESCRIPTION OF THE PREFERRED EMBODIMENTS

Embodiments of the present invention are explained in conjunction with drawings. In respective drawings and respective embodiments, the identical or similar constitutional elements are given same symbols and their explanation is omitted.

Embodiment 1

(Constitution)

Figure 1:
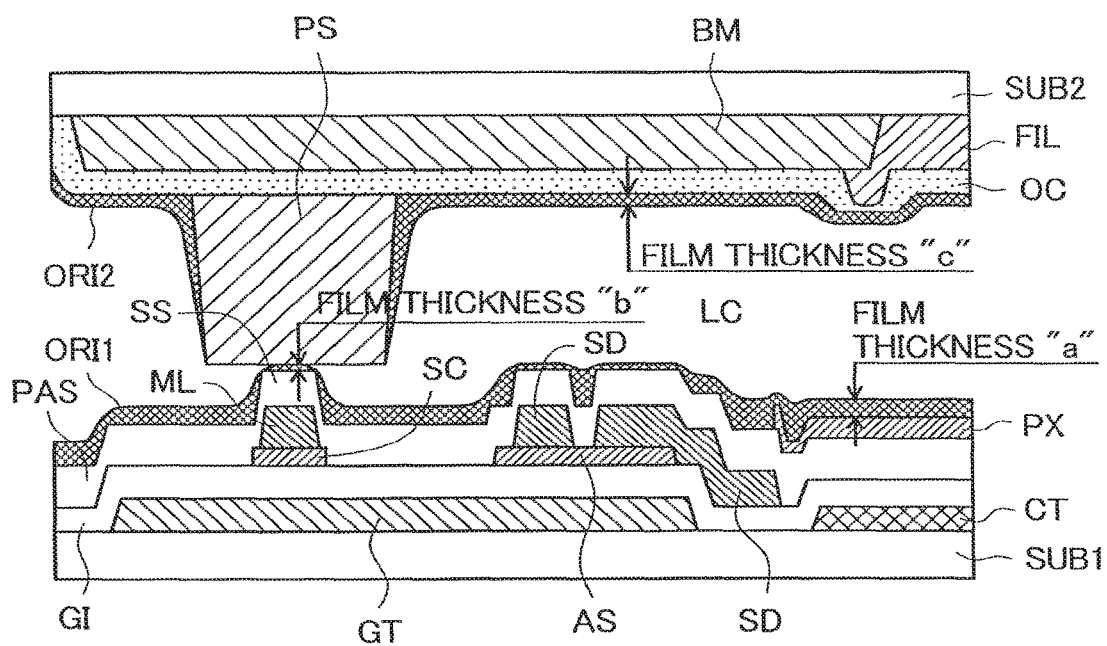
FIG. 1 is a cross-sectional view of an essential part showing an embodiment 1 of a liquid crystal display device according to the present invention.

FIG. 1 shows a cross section of a liquid crystal display device (panel) of the present invention. FIG. 1 shows a portion of the liquid crystal display device where a pillar-shaped spacer and a spacer pedestal are formed and a periphery of such a portion. FIG. 1 shows the constitution of the liquid crystal display device corresponding to the examples 1 to 4.

In FIG. 1, a so-called electrode substrate and a so-called counter substrate are arranged to face each other in are opposed manner with a liquid crystal layer LC sandwiched therebetween.

The electrode substrate has following constitution, for example. First of all, the electrode substrate includes, a substrate SUB1. On a liquid-crystal-layer-LC-side surface of the substrate SUB1, gate electrodes GT and counter electrodes CT are formed. The gate electrode GT constitutes a gate electrode of a thin film transistor TFT described later, and a scanning signal is supplied to the gate electrode GT from a gate signal line not shown in the drawing. The counter electrode CT is an electrode which is provided for generating an electric field in the liquid crystal layer LC in corporation with a pixel electrode PX described later. The counter electrode CT is a planar electrode formed of an ITO (Indium Tin Oxide) film, for example, which is formed over the substantially whole region of the pixel.

On a surface of the substrate SUB1, n insulation film GI is formed so as to also cover the gate electrodes GT and the counter electrodes CT. The gate insulation film GI functions as a gate insulation film to a region where the thin film transistor TFT is formed.

A semiconductor layer AS is formed on the gate insulation film GI so as to overlap with the gate electrode GT, and a drain electrode SD and a source electrode SD are formed on an upper surface of the semiconductor layer AS thus constituting a
thin film transistor TFT. A video signal is supplied to one electrode out of the drain electrode SD and the source electrode SD via a drain signal line not shown in the drawing. Further, another electrode out of the drain electrode SD and the source electrode SD extends to the outside of a region where the thin film transistor TFT is formed, and is electrically connected with the pixel electrode PX described later.

Then, in a region outside the region where the thin film transistor TFT is formed (for example, a region which overlaps with the gate signal line), a stacked body constituted of a semiconductor layer SC and a metal layer ML is formed. The semiconductor layer SC is formed simultaneously with the formation of the semiconductor layer AS, while the metal layer ML is formed simultaneously with the formation of the drain electrode SD and the source electrode SD. The stacked body constituted of the semiconductor layer SC and the metal layer ML forms a spacer pedestal SS together with a protective film PAS described later.

On a surface of the substrate SUB1, the protective film PAS is formed so as to also cover the thin film transistor TFT and the stacked body constituted of the semiconductor layer SC and the metal layer ML. The protective film PAS is provided for obviating a direct contact between the thin film transistor TFT and the liquid crystal, and is formed of an inorganic insulation film, for example. On a portion of the protective film PAS where the stacked body constituted of the semiconductor layer SC and the metal layer ML is formed, a projecting portion which projects than a periphery thereof is formed and the projecting portion functions as the spacer pedestal SS.

A pixel electrode PX which is constituted of a plurality of linear electrodes arranged parallel to each other is formed on an upper surface of the protective film PAS in a region where the pixel electrode PX overlaps with the counter electrode CT. The pixel electrode PX is formed of an ITO (Indium Tin Oxide) film, for example. The pixel electrode PX is electrically connected with another electrode out of the drain electrode SD and the source electrode SD of the thin film transistor TFT via a through hole formed in the protective film PAS at a position not shown in the drawing.

An alignment film ORI1 made of a photo decomposition-type material is formed on a liquid-crystal-LC-side surface of the substrate SUB1 so as to also cover the pixel electrodes PX. The film thickness "b" of the alignment film ORI1 on a top surface of the spacer pedestal SS is set smaller than the film thickness "a" of the alignment film ORI1 in a region other than the top surface of the spacer pedestal SS (for example, above the pixel electrode PX), or the film thickness "b" is set to zero. The film thickness "b" of the alignment film ORI1 on the top surface of the spacer pedestal SS is set to a value of not more than 30 nm. Here, the film thickness "a" of the alignment film ORI1 above the pixel electrode PX, for example, is set to 110 nm, for example. A manufacturing method of the alignment film ORI1 is explained in detail later.

On the other hand, the counter substrate is constituted as follows, for example. First of all, a substrate SUB2 is provided. A black matrix BM and color filters FIL are formed on a liquid-crystal-LC-side surface of the substrate SUS2. The black matrix BM is formed between neighboring pixel regions, and the color filter FIL is formed so as to cover each pixel region.

On an upper surface of the black matrix BM and upper surfaces of the color filters FIL, an overcoat film OC formed of a resin film, for example, is formed. The overcoat film OC may be omitted in this embodiment.

Pillar-shaped spacers PS, are formed on n upper surface of the overcoat film OC at positions where the pillar-shaped spacers PS face the spacer pedestals SS in an opposed manner. The pillar-shaped spacer PS is formed with a height and an area which are respectively larger than a height and an area of the spacer pedestal SS. The pillar-shaped spacers PS re formed by selectively etching a resin film applied the upper surface of the overcoat film OC by coating, and the pillar-shaped spacer PS has a flat top surface.

Then, an alignment film ORI2 is formed on a liquid-crystal-LC-side surface of the substrate SUB2. The film thickness of the alignment film ORI2 on a top surface of the pillar-shaped spacer PS is set smaller than a film thickness "c" of the alignment film ORI2 in a region other than the top surface of the pillar-shaped spacer PS (for example, above the black matrix BM), or the film thickness of the alignment film ORI2 on the top surface of the pillar-shaped spacer PS is set to zero. The reduction of the film thickness of the alignment film ORI2 on the top surface of the pillar-shaped spacer can be realized by applying an alignment film material to liquid-crystal-LC-side surface of the substrate SUB2 and, thereafter, by performing time-prolonged leveling corresponding to viscosity by prolonging a leveling time.

With respect to the liquid crystal display device having such constitution, materials and film thicknesses of the above-mentioned respective members are described in tables shown in FIG. 2. The upper table shown in FIG. 2 describes the members on the counter substrate, wherein from a substrate SUB2 side to a liquid crystal layer LC side, sequentially, the black matrix BM (indicated by GM in the table), the color filter FIL (indicated by color pixel layer in the table), the overcoat film OC (indicated by overcoat in the table), the pillar-shaped spacer (indicated by pillar-shaped spacer in the table), and the alignment film ORI2 (indicate by alignment film (film thickness are listed. Here, the film thickness of the alignment film ORI2 indicates a film thickness at a portion where the film thickness is set to the film thickness "c" in FIG. 1, and a value of the film thickness is described separately (see FIG. 3). The lower table shown in FIG. 2 describes the members formed on the electrode substrate, wherein from the liquid crystal layer LC side to the substrate SUB1 side, sequentially, the alignment film ORI1 (indicated by alignment film (film thickness: "a") in the table), the pixel electrode PX (indicated by pixel electrode in the table), the protective film PAS (indicated by protective film in the table), the source electrode and the drain electrode (indicated by source/drain in the table), the semiconductor device AS (indicated by a-Si in the table), the insulation film GI (indicated by gate insulation film in the table), the gate electrode (indicated by gate in the table), and the counter electrode (indicated by common ITO in the table) are listed. Here, the film thickness of the alignment film ORI1 indicates a film thickness at a portion where the film thickness is set to the film thickness "a" ire FIG. 1. The value of the film thickness is described separately (see FIG. 3).

(Manufacturing Method)

Next, one embodiment of a manufacturing method of the above-mentioned alignment film ORI1 and a manufacturing method of the alignment film ORI2 respectively is described. Although the explanation made hereinafter is directed to the manufacturing method of the alignment film ORI1, the alignment film ORI2 is manufactured substantially in the same manner.

First of all, an alignment film material is printed on the protect is PAS formed on the electrode substrate by a printer, for example, such that the alignment film material also covers the spacer pedestals SS. The alignment film material is made of a material having a skeleton formed of cyclobutane tetracarboxylic acid-diamine phenyl ether, for example. Here, solution concentration and solution viscosity of the alignment film material are made different corresponding to a plurality of examples. That is as described in the table shown in FIG. 3, solution concentration and solution viscosity of the alignment film material are respectively set to 7 wt %, 30 mPa·s (example 7 wt %, 25 mPa·s (example 2), 8 wt %, 20 mPa·s (example), and 7 wt %, 35 mPa·s (example 4). Here, ire all examples, solution viscosity is set to a value smaller than 35 mPa·s.

Then, the electrode substrates heated on a hot plate t a temperature of 80° C. for 3 minutes and, thereafter, is baked at temperature of 220° C. for 60 minutes. Here, the film thickness of the alignment film material at the portion where the film thickness assumes the film thickness "a", the portion where the film thickness assumes the film thickness "b" and the portion where the film thickness assumes the film thickness "c" in FIG. 1 is described for the above-mentioned respective examples 1 to 4 in the table shown in FIG. 3 (item: before radiation of light).

Thereafter, on the hot plate held at a temperature ref 200° C., light (polarization light containing ultraviolet rays) generated by a low pressure mercury lamp (integrated illuminance 5 mW/cm2 at 230 to 330 nm) is radiated for 1000 seconds (integrated radiation quantity: 5 J/cm2). Here, the film thickness of the alignment film material at the portion where the film thickness assumes the film thickness "a", the portion where the film thickness assumes the film thickness "b" and the portion where the film thickness assumes the film thickness "c" in FIG. 1 is described for the above-mentioned respective examples 1 to 4 in the table shown in FIG. 3 (item: after radiation of light). As can be clearly understood from this table, in all embodiments, the film thickness of the alignment film ORI1 on the top surface of the spacer pedestal SS can be set to a value of not more than 30 nm. That is, the film thickness of the alignment film ORI1 on the top surface of the sparer pedestal SS is set to 13 nm in the example 1, 10 nm in the example 2, 8 nm in the example 3 and 30 nm in the example 4. On the other hand the film thickness of the alignment film ORI1 in other region except for the top surface of the spacer pedestal SS (the region above the pixel electrode PX) is set to 110 nm in the example 1, 100 nm in the example 2, 110 nm in the example 3, and 120 nm in the example 4.

Further, the film thickness of the alignment film ORI2 on the counter substrate side is set, at a portion in FIG. 1 where the film thickness assumes the film thickness "c", to 110 nm in the example 1, 100 nm in the example 2, 110 nm in the example 3 and 120 nm in the example 4, while the film thickness of the alignment film ORI2 assumes value which is substantially zero on the top surface of the pillar-shaped spacer PS although not shown in FIG. 3.

In FIG. 3, for a comparison purpose, comparison examples 1 to 3 are also described. FIG. 3 shows a case where solution concentration and solution viscosity of the alignment film material are respectively set to 6 wt %, 50 mPa·s (comparison example 1), 5 wt %, 45 mPa·s (comparison example 2), and 6 wt %, 40 mPa·s (comparison example 3), wherein solution viscosity is set to a value, larger than 35 mPa·s. In the table shown in FIG. 3, the film thickness of the alignment film before radiation of light and the film thickness of the alignment film after radiation of light are described in association with the above-mentioned examples. Here, it is found that the film thickness of the alignment film ORI1 on the top surface of the spacer pedestal SS becomes larger than 30 nm.

Embodiment 2

(Constitution)

Figure 4:
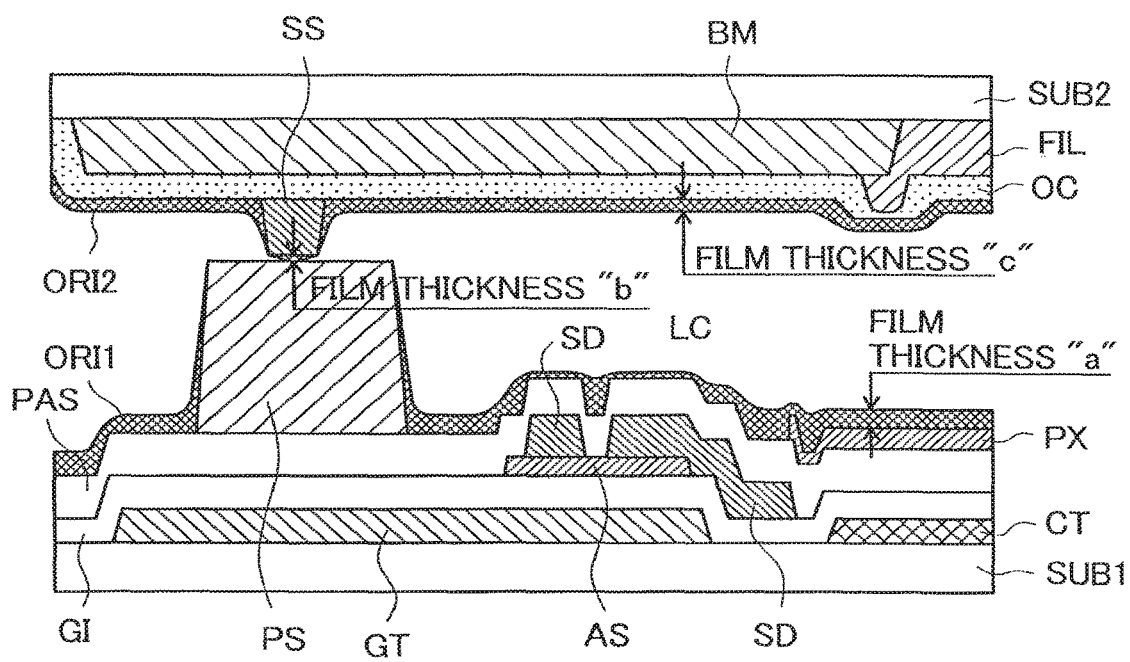
FIG. 4 is a cross-sectional view of an essential part showing an embodiment 2 of a liquid crystal display device according to the present invention.

FIG. 4 shows the constitution of a liquid crystal display device corresponding to the examples 5 to 8, and corresponds to FIG. 1.

The constitution which makes the liquid crystal display device shown in FIG. 4 different from id crystal display device shown in FIG. 1 lies in that, first of all, the pillar-shaped spacers PS are formed on an electrode substrate side, and spacer pedestals SS are formed on the counter electrode side. Further, the spacer pedestals SS are formed on an upper surface of an overcoat film OC as a resin layer, for example.

Also in this case, the film thickness "b" of an alignment ORI2 on a top surface of the spacer pedestal BB is set smaller than a film thickness "c" of the alignment film ORI2 in a region other than the top surface of the spacer pedestal SS (for example, above a black matrix BM), or the film thickness "b" is set to zero. The film thickness "b" of the alignment film ORI2 on the top surface of the spacer pedestal SS is set to a value of not more than 30 nm. Here, the film thickness "c" of the alignment film ORI2 on the black matrix BM, for example, is set to 110 nm, for example.

With respect to the liquid crystal display device having such constitution, materials and film thicknesses of the above-mentioned respective members are described in tables shown in FIG. 5. The upper table shown in FIG. 5 describes the members on the counter substrate, wherein from a substrate SUB2 side to a liquid crystal layer LC side, sequentially, the black matrix BM (indicated by BM in the table), the color filter FIL (indicated by color pixel layer in the table), the overcoat film OC (indicated by overcoat in the table), the spacer pedestal (indicated by pedestal in the table), and the alignment film ORI2 (indicated by alignment film (film thickness: "c") in the table) are listed. Here, the film thickness of the alignment film ORI2 indicates a film thickness at a portion where the film thickness is set to the film thickness "c" in FIG. 4. The value of the film thickness is described separately (see FIG. 6). The lower table shown in FIG. 5 describes the members formed on the electrode substrate, wherein from the liquid crystal layer LC side to the substrate SUB1 side, sequentially, the alignment film ORI1 (indicated by alignment film (film thickness: "a") in the table) the pillar-shaped spacer PS (indicated by pillar-shaped spacer in the table), the pixel electrode PX (indicated by pixel electrode in the table), the protective film PAS (indicated by protective film in the table), the source electrode and the drain electrode (indicated by source/drain in the table), the semiconductor device AS (indicated by a-Si in the table), the insulation film GI (indicated by gate insulation film in the table), the gate electrode (indicated by gate in the table), and the counter electrode CT (indicated by common ITO in the table) are listed. Here, the film thickness of the alignment film ORI1 indicates a film thickness at a portion where the film thickness is set to the thickness "a" in FIG. 1. The value of the film thickness is described separately (see FIG. 6).

(Manufacturing Method)

The manufacturing method of the alignment film ORI1 and the manufacturing method of the alignment film ORI2 are substantially equal to the corresponding manufacturing methods described in the embodiment 1.

Solution concentration and solution viscosity of alignment film material are made different corresponding to a plurality of examples. That is, as described in the table shown in FIG. 6, solution concentration and solution viscosity of the alignment film material are respectively set to 7 wt %, 30 mPa·s (example 5), 7 wt %, 25 mPa·s (example 6), 6 wt %, 25 mPa·s (example 7), and 7 wt % 35 mPa·s (example 8). Here, in all examples, solution viscosity is set to a value smaller than 35 mPa·s.

Here, the film thickness of the alignment film materiel at the portion where the film thickness assumes the film thickness "a", the portion where the film thickness assumes the film thickness "b" end the portion where the film thickness assumes the film thickness "c" in FIG. 4 is described for the above-mentioned respective examples 5 to 8 in the table shown in FIG. 4 (item: after radiation of light). As can be clearly understood from this table, in all embodiments, the film thickness of the alignment film ORI1 on the top surface of the spacer pedestal SS can be set to a value of not more than 30 nm. That is, the film thickness of the alignment film ORI1 on the top surface of the spacer pedestal SS is set to 13 nm in the example 5, 10 nm in the example 6, 8 nm the example 7 and 30 nm in the example 8. On the other hand, the film thickness "c" of the alignment film ORI2 in other region except for the top surface of the spacer pedestal SS (the region above the black matrix BM) is set to 110 nm in the example 5, 100 nm in the example 6, 110 nm in the example 7, and 120 nm in the example 8.

Further, the film thickness of the alignment ORI1 on the counter substrate side is set, at portion in FIG. 4 where the film thickness assumes the film thickness "a", to 110 nm in the example 5, 100 nm in the example 6, 110 nm in the example 7 and 120 nm in the example 8, while the film thickness of the alignment film ORI1 assumes a value which is approximately zero on the top surface of the pillar-shaped spacer PS although not shown in FIG. 6.

In FIG. 6, for a comparison purpose, comparison examples 4 to 6 are also described. FIG. 6 shows a case where solution concentration and solution viscosity of the alignment film material are respectively set to 6 wt %, 50 mPa·s (comparison example 4). 5 wt %, 45 mPa·s (comparison example 5), and 6 wt %, 40 mPa·s (comparison example 6). In the table shown in FIG. 6, the film thickness of the alignment film before radiation of light and the film thickness of the alignment film after radiation of light are described in association with the above-mentioned examples. Here, it is found that to film thickness of the alignment film ORI1 on the top surface of the spacer pedestal SS becomes larger than 30 nm.

Embodiment 3

(Constitution)

Figure 7:
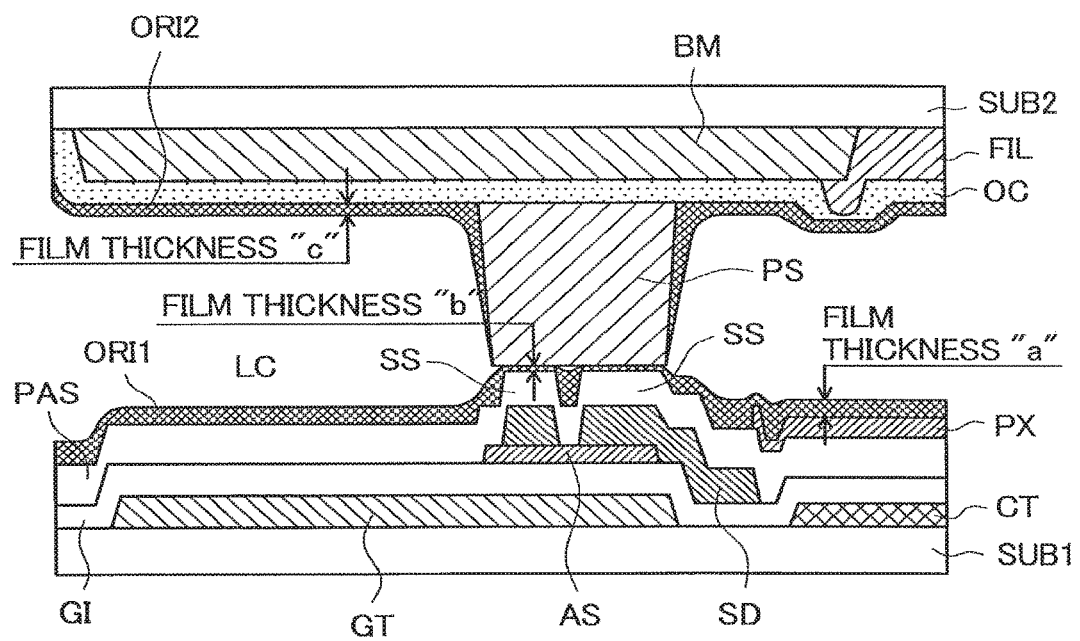
FIG. 7 is a cross-sectional view of an essential part showing an embodiment 3 of a liquid crystal display device according to the present invention.

FIG. 7 shows the constitution of a liquid crystal display device corresponding to examples 9 to 11 and corresponds to FIG. 1.

The constitution which makes this embodiment different from the embodiment shown in FIG. 1 lies in that the spacer pedestal SS shown in FIG. 1 is not particularly necessary in this embodiment and a portion where a thin film transistor TFT is formed to function as a spacer pedestal. It is because that a drain electrode SD and a source electrode SD of the thin film transistor TFT are formed as projecting portions higher than a periphery of these portions and hence, these portions can be also used as a spacer pedestal SS.

Also in this case, a film thickness "b" of an alignment film ORI1 on an upper surface of the thin film transistor TFT is set smaller than a film thickness "a" of the alignment film ORI1 in a region other than the upper surface of the thin film transistor TFT (for example, above a pixel electrode PX), or the film thickness "b" is set to zero. The film thickness "b" of the alignment film ORI1 on the upper surface of the thin film transistor TFT is set to a value of not more than 30 nm. Here, the film thickness "a" of the alignment film ORI1 on the pixel electrode PX, for exam 110 nm, for example.

In such constitution, materials and film thicknesses of respective members of the embodiment 2 are substantially equal to the materials and the film thicknesses of the respective corresponding members described in the embodiment 1. That is, materials and film thicknesses of respective members have values substantially equal to values in the table shown in FIG. 2.

(Manufacturing Method)

The manufacturing method of the alignment film ORI1 and the manufacturing method of the alignment film ORI2 are substantially equal to the corresponding manufacturing methods described in the embodiment 1.

Solution concentration and viscosity of the alignment film material are made different corresponding a plurality of examples. That is, as described in the table shown in FIG. 8, solution concentration and solution viscosity of the alignment film material are respectively set to 7 wt % 30 mPa·s (example 9), 7 wt %, 25 mPa·s (example 10), and 8 wt %, 25 mPa·s (example 11). Here, in all examples, solution viscosity is set to a value smaller than 35 mPa·s.

Here, the film thickness of the alignment film material at the portion where the film thickness assumes the film thickness "a" the portion where the film thickness assumes the film thickness "b" and the portion where the film thickness assumes the film thickness "c" is described for the above-mentioned respective examples 9 to 11 in the table shown in FIG. 8 (item: after radiation of light). As can be clearly understood from this table, in all embodiments, the film thickness of the alignment film ORI1 on the upper surface of the thin film transistor TFT can be set to a value of not more than 30 nm. That is, the film thickness of the alignment film ORI1 on the upper surface of the thin film transistor TFT is set to 21 nm in the example 9, 18 nm in the example 10, and 14 nm in the example 11. On the ether hand, the film thickness of the alignment film ORI1 in other region except for the upper surface of the thin film transistor TFT (the region above the pixel electrode PX) is set to 110 nm in the example 9, 100 nm in the example 10, and 110 nm in the example 11.

Further, the film thickness of the alignment film ORI2 on she counter substrate side is set, at a portion in FIG. 7 where the film thickness assumes the film thick "c", to 110 nm in the example 9, 100 nm in the example 10, and 110 nm ire the example 11, while the film thickness of the alignment film ORI2 assumes a value which is approximately zero on the top surface of the pillar-shaped spacer PS although not shown in FIG. 8.

In FIG. 8, for a comparison purpose, comparison examples 7 to 9 are also described. FIG. 8 shows a case where solution concentration and solution viscosity of the alignment film material are respectively set to 6 wt %, 50 mPa·s (comparison example 7), 5 wt %, 45 mPa·s (comparison example 8), and 6 wt %, 40 mPa·s (comparison example 9). In the table shown in FIG. 8, the film thickness of the alignment film before radiation of light and the film thickness of the alignment film after radiation of light are described in association with the above-mentioned examples. Here, it is found that the film thickness of the alignment film ORI1 on the top surface of the spacer pedestal SS becomes larger than 30 nm.

Comparison Example 10

Figure 9:
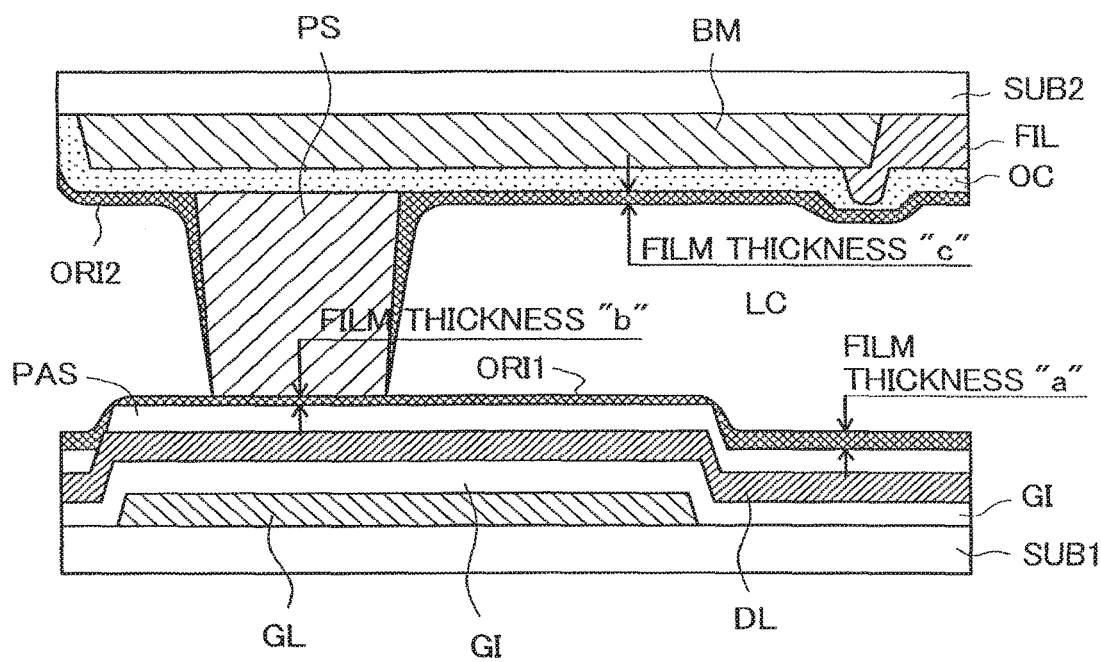
FIG. 9 is a cross-sectional view of an essential part shoving an example of a liquid crystal display device which constitutes a comparison example.

FIG. 9 shows the constitution in which a spacer pedestal (or a part which replaces the spacer pedestal such as the above-mentioned thin film transistor TFT) is not provided at a position which faces a pillar-shaped spacer PS. That is, FIG. 9 shows a comparison example which facilitates the understanding of advantageous effects of the above-mentioned respective examples in terms of quantity.

FIG. 9 corresponds to FIG. 1 and shows the constitution where the pillar-shaped spacer PS on a counter substrate side faces an alignment film ORI1 on an electrode substrate at an intersecting position of a gate signal line GL and a drain signal line DL.

In this case, a manufacturing method of the alignment film ORI1 is substantially equal to the manufacturing method of the alignment film ORI1 explained in conjunction with the embodiment 1, wherein solution concentration and solution viscosity of an alignment film material are set to 7 wt % and 30 mPa·s, for example, as shown in FIG. 10. Further, in a table shown in FIG. 10, a film thickness of the alignment film material at positions where the film thickness is set to a film thickness "a", film thickness "b" and a film thickness "c" in FIG. 9 is described with respect to a case before radiation of light and a case after radiation of light respectively. In this case, the film thickness "b" of the alignment film ORI1 which faces the pillar-shaped spacer PS after the radiation of light becomes 100 nm so that the film thickness "b" of the alignment film ORI1 largely exceeds 30 nm.

That is, on a liquid-crystal-layer-LC-side surface of the electrode substrate which faces the pillar-shaped spacer PS in an opposed manner, the liquid-crystal-layer-LC-side surface of the electrode substrate is only 300 nm which is a film thickness of the gate signal line GL, and the alignment film ORI1 is brought into contact with the top surface over an area larger than an area of the top surface of the pillar-shaped spacer PS and hence, the film thickness "b" of the alignment film ORI1 is largely increased to 100 nm even after the radiation of light.

FIG. 11 shows a result of inspection of respective bright-spot-generation withstand voltage levels with respect to the examples 1 to 4, the comparison examples 1 to 3 the examples 5 to 8, the comparison examples 4 to 6, examples 9 to 11, and the comparison examples 7 to 10.

FIG. 11 shows the respective bright-spot-generation withstand voltage levels with respect to the film thickness "b" of the alignment film which faces the pillar-shaped spacer PS after radiation of light in the respective examples and the respective comparison examples.

Here, the bright-spot-generation withstand voltage level is classified into 7 stages consisting of 0 to 6. As shown in FIG. 12, the bright-spot-generation withstand voltage level is evaluated based on the presence or the non-presence of the generation of bright spots at the time of completion of the liquid crystal display device, the presence or the non-presence of the abrasion of the surface alignment film at the time of disassembling the liquid crystal display device, the presence the non-presence of the generation of bright spots after a vibration test (3G), the presence or the non-presence of the abrasion of the surface alignment film after the vibration test (3G), the presence or the non-presence of generation of bright spots after a vibration test (5G), and the presence or the non-presence of the abrasion of the surface alignment film after the vibration test (5G). Here, with respect to the abrasion of the surface alignment film, there exists a possibility that even when the abrasion of the surface alignment film is not found in the observation carried out immediately after the test, an abraded portion which is concealed by a light blocking portion (a black matrix or the like, for example) appears on a display area due, to a change with time and hence, such abrasion is also subject to the evaluation.

Figure 13:
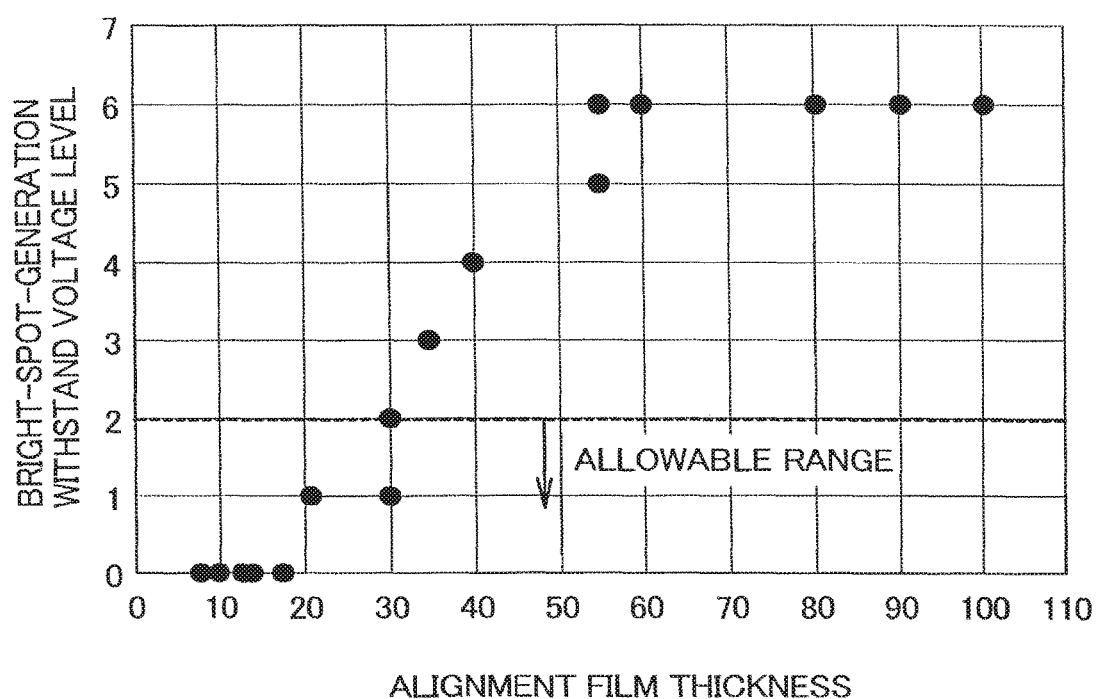
FIG. 13 is a view showing a graph which is obtained by converting the table shown in FIG. 11.

FIG. 13 is a graph converted from the table shown in FIG. 11, wherein an alignment film thickness (nm) is taken on an abscissa, and the bright-spot-generation withstand voltage level is taken on an ordinate. An allowable range is set such that it is sufficient for a liquid crystal display device that no abrasion of the surface alignment film occurs in the vibration test (3G) and a liquid crystal display device whose bright-spot-generation withstand voltage level is up to 2 is rendered acceptable. In this case, it is understood that the film thickness "b" of the alignment film which faces the pillar-shaped spacer PS after the radiation of light is set to a value of not more than 30 nm.

What is claimed is:
1. A liquid crystal display device comprising:
a first substrate;
a first alignment film on the first substrate;
a second substrate;
a second alignment film on the second substrate;
a liquid crystal layer sandwiched between the first alignment film and the second alignment film;
a projecting portion on the second substrate;
a first electrode in a pixel region, the first electrode between the first alignment film and the first substrate; and
an insulation film between the first substrate and the liquid crystal layer,
wherein the first electrode and the insulation film are covered by the first alignment film,
wherein the first alignment film or the second alignment film is a photo alignment film, and
wherein a thickness "d2" of the second alignment film on the projecting portion and a thickness "d1" of the second alignment film around the projecting portion satisfy a formula (1),

$$d2 < d1 \qquad (1).$$

2. The liquid crystal display device according to claim 1 further comprising:
a second electrode formed between the first alignment film and the first substrate,
wherein the liquid crystal layer is controlled by an electric field generated between the first electrode and the second electrode.

3. The liquid crystal display device according to claim 1 further comprising:
a second electrode formed between the first alignment film and the first substrate, wherein the second electrode is a planar electrode and the first electrode is a linear electrode, and wherein the first electrode is disposed between the second electrode and the liquid crystal layer.

4. The liquid crystal display device according to claim 1, further comprising a facing portion, the facing portion faces the projecting portion.

5. The liquid crystal display device according to claim 4, further comprising:

a semiconductor layer disposed between the facing portion and the first substrate; and a stacked structure constituted of the semiconductor layer and a metal layer, wherein the stacked structure is disposed between the facing portion and the first substrate.

6. The liquid crystal display device according to claim 4, further comprising a thin film transistor having a source electrode and a drain electrode, wherein the stacked structure connects either the source electrode or the drain electrode.

7. The liquid crystal display device according to claim 1, wherein the first alignment film or the second alignment film includes a coupling agent.

8. The liquid crystal display device according to claim 1, wherein the first alignment film is formed from a material having a skeleton of cyclobutene tetracarboxylic acid.

9. The liquid crystal display device according to claim 1, wherein the first alignment film is made from a material having a skeleton of diamine phenyl ether.

10. The liquid crystal display device according to claim 4, further comprising:

a gate line;

a thin film transistor; and a stacked structure constituted of a semiconductor layer and a metal layer, wherein the gate line overlaps with the thin film transistor and the stacked structure, and wherein the small projection includes the stacked structure.

11. A liquid crystal display device comprising:

a first substrate;

a first alignment film on the first substrate;

a second substrate;

a second alignment film on the second substrate;

a liquid crystal layer sandwiched between the first alignment film and the second alignment film;

a projecting portion on the first substrate;

a facing portion on the second substrate;

a first electrode in a pixel region, the first electrode between the first alignment film and the first substrate; and an insulation film between the first substrate and the liquid crystal layer;

wherein the first electrode and the insulation film are covered by the first alignment film, wherein the facing portion faces the projecting portion, wherein the first alignment film or the second alignment film is a photo alignment film, and wherein a thickness "d2" of the second alignment film on the projecting portion and a thickness "d1" of the second alignment film around the projecting portion satisfy a formula (1), $$d2<d1 \qquad (1).$$

12. The liquid crystal display device according to claim 11 further comprising:

a second electrode formed between the first alignment film and the first substrate, wherein the liquid crystal layer is controlled by an electric field generated between the first electrode and the second electrode.

13. The liquid crystal display device according to claim 11 further comprising:

a second electrode formed between the first alignment film and the first substrate, wherein the second electrode is a planar electrode and the first electrode is a linear electrode, and wherein the first electrode is disposed between the second electrode and the liquid crystal layer.

14. The liquid crystal display device according to claim 11, further comprising a metal layer disposed between the projecting portion and the first substrate.

15. The liquid crystal display device according to claim 11, wherein the first alignment film or the second alignment film includes a coupling agent.

16. The liquid crystal display device according to claim 11, wherein the first alignment film is formed from a material having a skeleton of cyclobutene tetracarboxylic acid.

17. The liquid crystal display device according to claim 11, wherein the first alignment film is made from a material having a skeleton of diamine phenyl ether.

18. The liquid crystal display device according to claim 11, further comprising:

a gate line, wherein the gate line is disposed between the first substrate and the projecting portion.

* * * * *